3,382,104
METHOD OF HEATING A FUEL CELL
Charles H. Worsham, Fanwood, and James A. Wilson, Stanhope, N.J., assignors to Esso Research and Engineering Company, a corporation of Delaware
Filed June 5, 1964, Ser. No. 372,757
2 Claims. (Cl. 136—86)

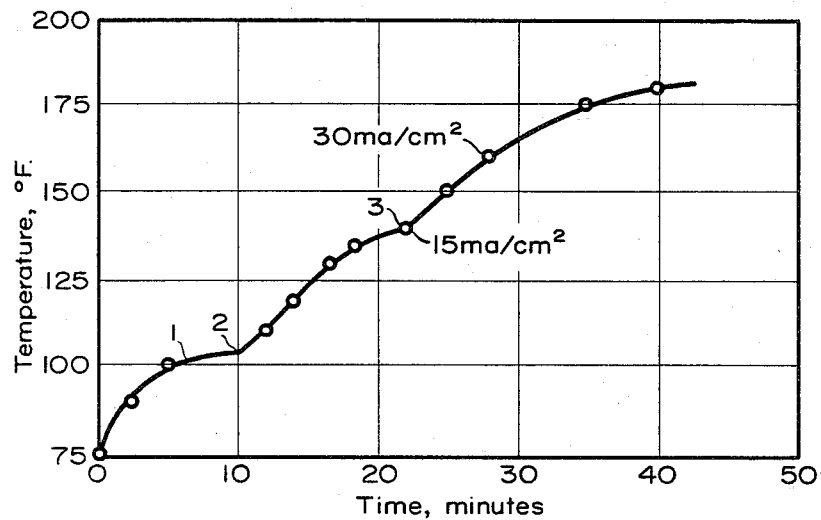

ABSTRACT OF THE DISCLOSURE

The start-up of a fuel cell which uses methanol as fuel is effectively accomplished by introducing methanol in excess of that required for power output, allowing a controlled amount of the methanol to contact the cathode where air, the oxidant, is contacted with the cathode at a rate between 1200 cc.'s and 1700 cc.'s per minute per square foot of the cathode for chemical oxidation which effects heating of the cell to an efficient operating temperature above about 140° F. before the cell is under a load for power output.

---

This invention relates to a process for the start-up of a fuel cell. In particular, this invention is directed to a process wherein fuel is allowed to contact the cathode. More particularly, the invention is directed to a process wherein the fuel is introduced in excess to the anode of a fuel cell and the oxidant input is maintained in an optimum range.

One of the problems facing the art has been a method of quick start-up of a fuel cell. Various methods have been tried to efficiently heat the cell. Methods such as using an external source of heat, short circuiting the cell or putting the cell under a load and allowing it to heat up to the efficient operating temperature. These prior art methods have proven to be uneconomical, slow and highly inefficient.

Using an external source to heat the cell requires excessive equipment which adds to the weight and bulkiness of the fuel cell. One of the advantages of the fuel cell, of course, should be that the cell is compact and not bulky. Further, the external heating would, of course, require more fuel and this would decrease the efficiency of the cell.

Short circuiting the cell to obtain a current through the electrodes and thereby increase the heat of the cell has a disadvantage in that some catalysts will tend to be highly polarized and fail to function, that the time necessary to short circuit the cell and thereby heat is extensive and it requires a source of electricity which may not be available. If there were a source of electricity available, the necessity of using a fuel cell would be slight.

The heating of the cell by putting the cell under a load has certain drawbacks in that a number of catalysts will polarize to such an extent that they become, for any substantial purpose, inoperative when contacted with fuel at ambient or room temperatures.

It has now been found that fuel cells may be quickly and efficiently started by controlling the input of fuel and oxidant within certain ranges. The instant process requires that the fuel be introduced into the cell at a rate between equivalent to and fourfold that needed for chemical oxidation. If there is a load on the cell, that is, if there is a resistance connected between the positive and negative poles of the cell and power is being generated, the input of fuel should be at least about 5 times the amount of fuel necessary to produce electricity to satisfy the load. If there is no load on the cell, the fuel will simply be pumped through the cell. Either of the procedures, both of which lie within the 0 to 20% range, will provide a system for the efficient start-up of the cell.

During the start-up process, oxidant will be admitted to the cathode of the cell. Therefore, it would be apparent that the input of oxidant should be at a very low rate. However, it has now been found that the input of oxidant in the cell during start-up should be maintained between about 1200 cc.'s per minute per square foot of electrode to 1700 cc.'s per minute per square foot of electrode. If the input of oxidant is below the 1200 cc.'s per minute limit, the cell will level off at a temperature which is dependent upon the type of fuel being used and the temperature cannot be further increased. Usually this temperature at which the cell levels off is below the effective operating temperature of the cell. If the rate is above the 1700 limit then the cell will tend to be rapidly cooled and fail to attain the operating temperature. However, if the cell's input of oxidant is maintained between the aforesaid limits, the temperature of the cell will increase up to the operating temperature of the cell. Once the cell has become operational and on load, the temperature of the cell can be maintained by adjusting the system heat balance and other procedures known to the art.

The process of this invention can be practiced with any of the known fuel cells utilizing liquid fuels such as methanol, ethanol, glycol, propane, ethane, decane, hexane and hexene.

In the practice of this invention, the particular catalyst to be used at the anode and cathode of the fuel cell can be any of the known catalysts which are effective for the oxidation of fuels and the reduction of oxidants. Primarily, the oxidant will be air or oxygen. However, oxidants such as the halogens and peroxides can be used.

The instant invention, by using the limits set forth, can be used with either one cell or a plurality of cells connected in a battery. It is necessary to determine the total electrode surface area which is then multiplied times the air rate which is set forth to give the optimum air rate to be introduced into the cell. The amount of fuel to be introduced into the cell can be readily determined by the load placed upon the cell. Those skilled in the art can readily determine that amount of fuel necessary to give the electrical power needed.

If there is a load on the cell, the amount of fuel introduced during start-up should be large enough so that the amount being converted to provide electrical power is not more than 20% of the total fuel being introduced. If there is no load upon the cell, the fuel can be introduced at any convenient rate between equivalent to and fourfold that needed for oxidation at the cathode.

By using the process of this invention it is possible to heat the cell up to about 200° F. in about 25 to 45 minutes. If the catalyst being used in the cell is one which would permanently lose activity if placed under load at room temperature, the cell can be started simply by heating it by introducing oxidant and fuel to the cathode and anode, respectively, without a load being placed upon the cell. Once the temperature has risen above the critical temperature for the catalyst, a load can be introduced and the process for heating this cell can be continued until the operational temperature is achieved. Once the operational temperature is achieved, the regular procedure known to the routineer can be utilized in order to maintain the operation of the cell.

Referring now to the accompanying figure, there is shown a graph of the start-up conditions of a cell. The graph shows the start-up conditions when less than the required amount of oxidant is fed into the cell. It is to be noted that the cell temperature tends to level off at about 100° F. However, when the cell oxidant intake rate is increased to a value within the limits of this invention, the temperature rapidly increases. The change took place at the point marked 2. The cell was put on load at point 3. It is to be noted that at point 3 the rate of heating increases. This is due to the heat being generated by the load.

The following examples are submitted for the purpose of illustration only and are not deemed to be a limitation upon the scope of the invention as set forth in the appended claims.

Example 1

A fuel cell utilizing one molar methanol as the fuel, 3.7 molar aqueous sulfuric acid as the electrolyte and air as the oxidant were operated in accordance with the instant invention. The methanol was introduced into the cell as a mixture with the electrolyte. The cell was placed under a load and was heated to the operating temperature of 180° F. in 22 minutes.

Example 2

The start-up procedure of this invention was tested on a six-cell stack. The fuel used was one molar methanol and the electrolyte was 3.7 molar sulfuric acid. The fuel and electrolyte were mixed and introduced into the cell. The total electrode area was 1.8 square feet and the oxidant was introduced at a rate of 3,000 cc.'s per minute. The stack attained an operating temperature of 180° F. in 40 minutes.

Example 3

The start-up procedure of this invention was tested on a six-cell stack. The fuel used was one molar methanol and the electrolyte was 3.7 molar sulfuric acid. The fuel and electrolyte were mixed prior to introduction of same into the cell. The total electrode area was 1.8 square feet and the oxidant, air, was introduced at a rate of 2500 cc.'s per minute. The cell was put on load, that is, current of 15 amps./ft.$^2$ was drawn, after 8 minutes of warm-up. The cell attained an operating temperature of 140° F.

Example 4

The effect of varying the air rate during start-up was tested on a cell employing one molar methanol as the fuel and 3.7 molar sulfuric acid as the electrolyte. The total electrode area was 1.8 square feet and the oxidant, air, was introduced at varying rates. The oxidant input was maintained at 2500 cc.'s per minute for the first 8 minutes and there was a general heating effect of the cell. After 10 minutes the air rate was increased to 5,000 cc.'s per minute. The temperature of the cell during this time did not increase. The air rate was dropped and heating again took place. After about 15 minutes, the air rate was increased to about 2500 cc.'s per minute. During this period the general heating of the cell continued. The results of these tests are set forth in Table I which sets forth the time in minutes of the start-up procedure, the temperature of the cell in ° F. and the air rate in cc.'s per minute.

TABLE I

| Minutes | ° F. | Air, cc.'s/min. |
| --- | --- | --- |
| 0 | 75 | 0 |
| 2 | 90 | 2,500 |
| 4 | 98 | 2,500 |
| 6 | 105 | 2,500 |
| 8 | 115 | 2,500 |
| 10 | 120 | 5,000 |
| 12 | 120 | 5,000 |
| 14 | 125 | 1,300 |
| 16 | 128 | 2,500 |
| 18 | 133 | 2,500 |

The current was turned on after about 18 minutes and the cell attained the operating temperature.

A study of the above table will indicate that when the air rate is within the claimed limits that the general heating effect of the cell is maintained. However, when the air rate is increased above that of the claimed range, the heating effect is diminished. In this regard see the effect when the air rate is increased to 5,000 cc.'s per minute.

What is claimed is:

1. The method of starting a fuel cell which is to be operated under an electrical current-carrying load connected from a cathode to an anode in said cell at temperatures of about 140° to 200° F. by electrochemical reduction of oxygen at the cathode and electrochemical oxidation of methanol at the anode, which comprises the steps of:
   (a) introducing methanol into a liquid acid electrolyte which is contacted with the anode without said load, the methanol being introduced in excess of that required for power output of the cell and contacting the cathode at a controlled rate;
   (b) introducing air into contact with the cathode at a rate between 1200 cc.'s and 1700 cc.'s per minute per square foot of the cathode while the cell becomes heated through oxidation of methanol chemically at the cathode for heating the cell and thereby raising the temperature of the cell in the range of 75° to about 140° F.; and
   (c) connecting the load between the anode and cathode of the cell as it is operated following start-up at temperatures in the range of about 140° to 200° F.

2. The method of starting a battery of fuel cells having a total cathode surface area of 1.8 square feet, said battery producing electrical power after starting when oxygen is reduced electrochemically at cathodes in said cells while methanol is oxidized at anodes in said cells, which starting comprises the steps of:
   (a) introducing into contact with the anodes in said fuel cells 3.7 molar aqueous sulfuric acid as electrolyte containing methanol in a 1 molar concentration;
   (b) introducing air into contact with the cathodes at a rate of 3000 cc.'s per minute while the cell becomes heated up through temperatures in the range of 75° F. to an operating temperature of 140° F. by chemical oxidation reaction of oxygen in the thus introduced air with methanol which contacts the cathodes before connecting the anodes with the cathodes to produce power; and
   (c) connecting a load of 15 amps per square foot between the anodes and the cathodes of the battery after the cell attains an operating temperature of 140° F.

References Cited

UNITED STATES PATENTS

| 3,061,658 | 10/1962 | Blackmer | 136—86 |
| 3,227,585 | 1/1966 | Langford et al. | 136—86 |
| 3,268,364 | 8/1966 | Cade et al. | 136—86 |
| 3,287,167 | 11/1966 | Weiss et al. | 136—86 |

ALLEN B. CURTIS, *Primary Examiner.*

WINSTON A. DOUGLAS, *Examiner.*

H. FEELEY, *Assistant Examiner.*